(12) United States Patent
Tedesco

(10) Patent No.: US 9,004,123 B2
(45) Date of Patent: Apr. 14, 2015

(54) AGRICULTURAL TIRE WITH TREAD HAVING LUGS

(75) Inventor: Adriano Tedesco, Rome (IT)

(73) Assignee: Bridgestone Corporation, Tokyo (JP)

(*) Notice: Subject to any disclaimer, the term of this patent is extended or adjusted under 35 U.S.C. 154(b) by 1974 days.

(21) Appl. No.: 11/794,345

(22) PCT Filed: Dec. 27, 2005

(86) PCT No.: PCT/EP2005/057187
§ 371 (c)(1),
(2), (4) Date: Dec. 26, 2007

(87) PCT Pub. No.: WO2006/069999
PCT Pub. Date: Jul. 6, 2006

(65) Prior Publication Data
US 2008/0142134 A1    Jun. 19, 2008

(30) Foreign Application Priority Data

Dec. 28, 2004  (IT) .............................. TO2004A0908

(51) Int. Cl.
*B60C 11/11*    (2006.01)
*B60C 11/03*    (2006.01)

(52) U.S. Cl.
CPC .................................. *B60C 11/0316* (2013.04)

(58) Field of Classification Search
USPC .............. 152/209.12, 209.15, 209.18, 209.28
See application file for complete search history.

(56) References Cited

U.S. PATENT DOCUMENTS

| | | | | |
|---|---|---|---|---|
| 541,091 A | * | 6/1895 | Ives ............................. | 152/209.1 |
| 2,188,196 A | * | 1/1940 | Wanek ...................... | 152/209.12 |
| 4,057,089 A | * | 11/1977 | Johannsen ............... | 152/209.28 |
| 4,611,647 A | * | 9/1986 | Rimondi .................. | 152/209.12 |
| 4,667,717 A | * | 5/1987 | Graas ....................... | 152/209.28 |
| 5,353,854 A | * | 10/1994 | Landers et al. .......... | 152/209.28 |
| 5,450,885 A | * | 9/1995 | Hanya ...................... | 152/209.26 |
| 6,179,027 B1 | * | 1/2001 | Shimizu ................... | 152/209.12 |

FOREIGN PATENT DOCUMENTS

| | | | |
|---|---|---|---|
| AU | 2004222777 | * | 5/2005 |
| DE | 10 98 386 B | | 1/1991 |
| EP | 0 126 476 A | | 11/1984 |
| EP | 0 903 249 A1 | | 3/1999 |
| JP | 07-032820 A | | 2/1995 |
| JP | 9-254609 A | | 1/1998 |

* cited by examiner

*Primary Examiner* — Steven D Maki
(74) *Attorney, Agent, or Firm* — Sughrue Mion, PLLC

(57) ABSTRACT

A farm vehicle tire (1) having a tread (2), which has a toroidal base surface (3), and a number of lugs (5), each extending radially outwards from the base surface (3) and having a front wall (6) and a rear wall (7) with respect to a given rolling direction (8); the leading edge (11), with respect to the rolling direction (8), of the section of each lug (5) along any plane (12) perpendicular to an axis (4) of rotation of the tire is in the form of an involute curve outward of the base surface (3).

4 Claims, 2 Drawing Sheets

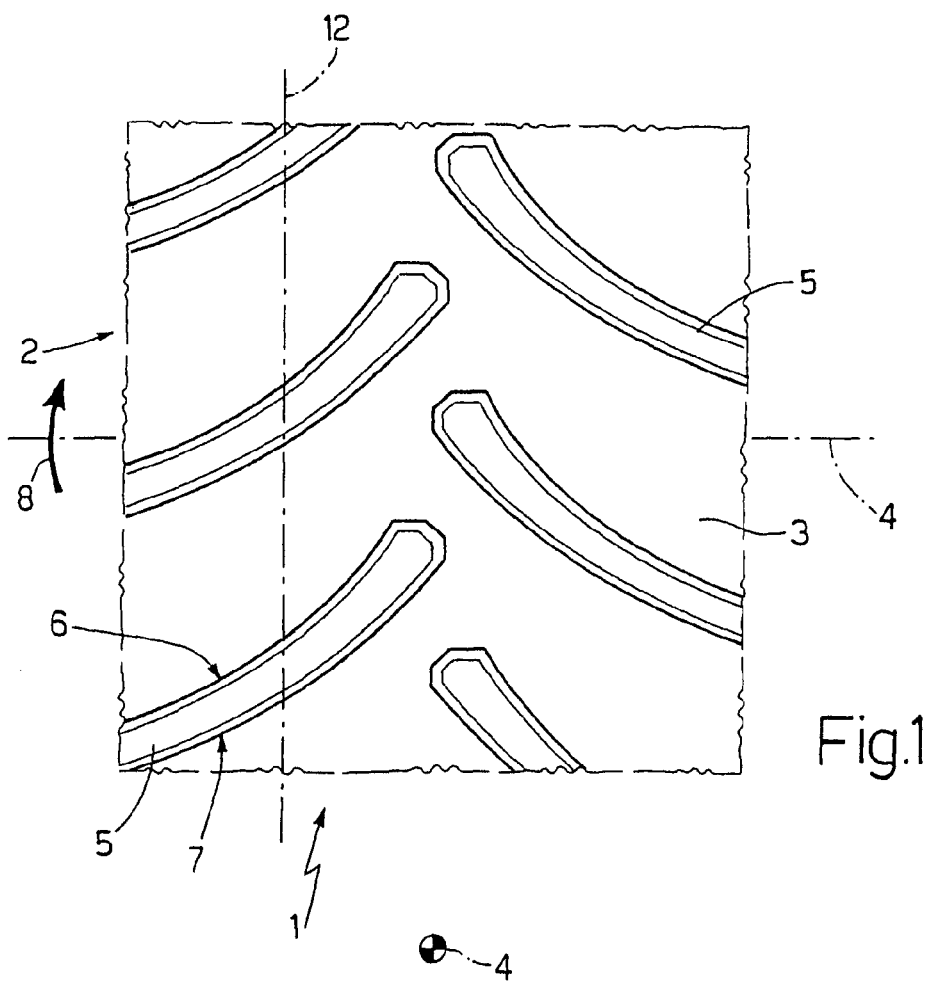
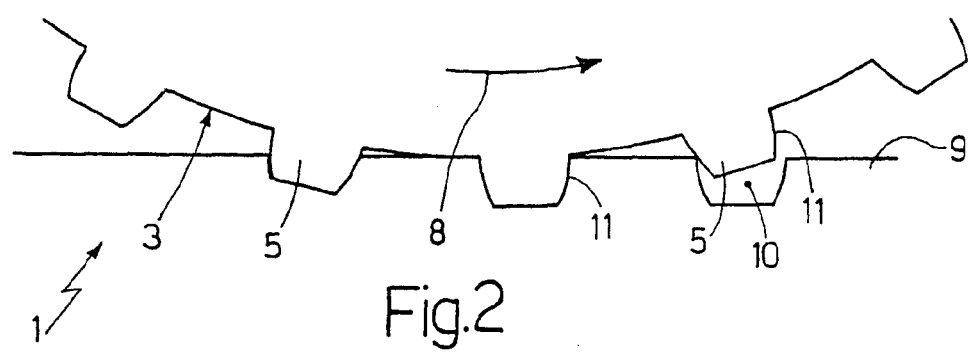

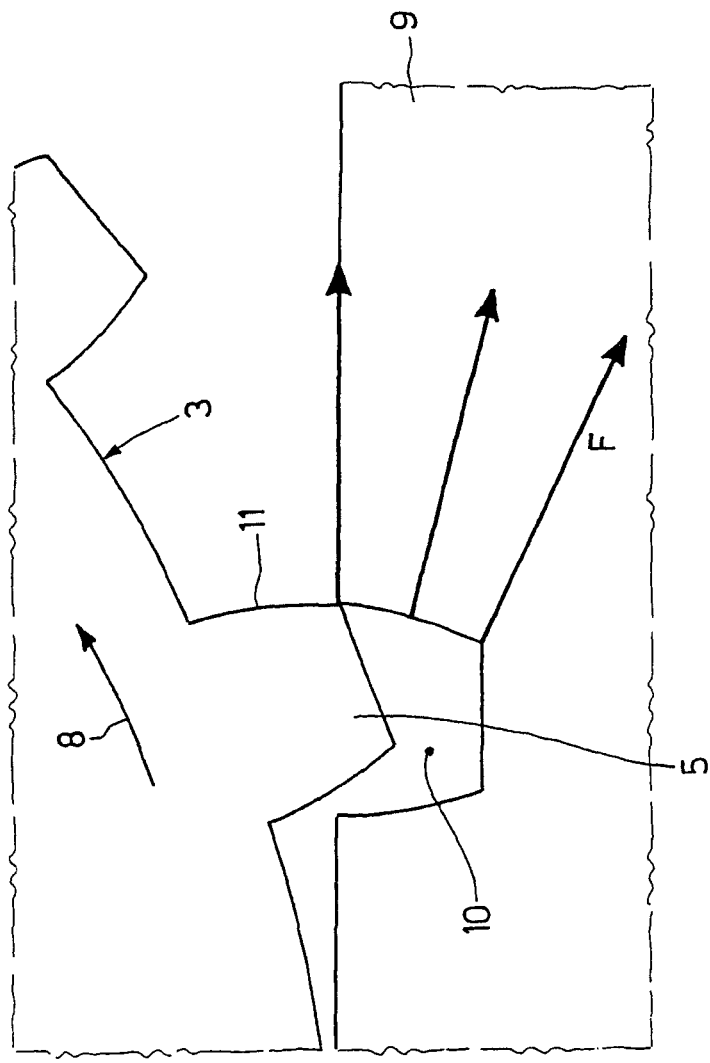

AGRICULTURAL TIRE WITH TREAD HAVING LUGS

TECHNICAL FIELD

The present invention relates to a farm vehicle tyre.

BACKGROUND ART

A farm vehicle tyre has a tread having a toroidal base surface extending about a central axis of rotation; and a number of lugs extend radially upwards from the base surface, and each have a front wall and a rear wall with respect to a given rolling direction.

Normally, the leading and trailing edges of the section of each lug with respect to a plane perpendicular to the axis of rotation are linear and converge outwards, so that each lug has a trapezoidal section with respect to a plane perpendicular to the axis of rotation.

To improve traction of a farm vehicle tyre on muddy terrain, Patent Application JP-7032820-A proposes a farm vehicle tyre in which the leading edge of the section of each lug in a plane perpendicular to the axis of rotation is a cycloid.

To improve traction of a farm vehicle tyre on muddy terrain, Patent Application EP-0903249-A1 proposes a farm vehicle tyre in which the leading edge of the section of each lug in a plane perpendicular to the axis of rotation comprises a curved bottom portion and a straight top portion.

DISCLOSURE OF INVENTION

It is an object of the present invention to provide a farm vehicle tyre designed for excellent traction, and which in particular is cheap and easy to produce.

According to the present invention, there is provided a farm vehicle tyre as claimed in the accompanying Claims.

BRIEF DESCRIPTION OF THE DRAWINGS

A non-limiting embodiment of the present invention will be described by way of example with reference to the accompanying drawings, in which:

FIG. 1 shows a schematic front view of a portion of a farm vehicle tyre in accordance with the present invention;

FIG. 2 shows a schematic side view of part of the FIG. 1 tyre;

FIG. 3 shows an enlarged detail of FIG. 2.

BEST MODE FOR CARRYING OUT THE INVENTION

Number 1 in FIG. 1 indicates as a whole a farm vehicle tyre comprising a tread 2 having a toroidal base surface 3 extending about a central axis 4 of rotation. A number of lugs 5, arranged symmetrically about axis 4 of rotation, extend radially outwards from base surface 3; and each lug 5 extends along a curved line, and has a front wall 6 and a rear wall 7 with respect to a given rolling direction 8 of tyre 1.

As shown in FIG. 2, in actual use, tyre 1 rotates about axis 4 of rotation, and rolls on soft ground 9 defining a rolling surface. As tyre 1 rolls along, base surface 3 contacts ground 9, which is therefore tangent to base surface 3; whereas lugs 5 sink into ground 9, and form in ground 9, by compression, holes 10 negatively reproducing the shape of lugs 5.

Lugs 5 are essential to enable tyre 1 to advance along ground 9, by the traction of tyre 1 depending solely on interaction between lugs 5 and ground 9. That is, the total traction of tyre 1 equals the sum of the horizontal components (i.e. parallel to ground 9) of the interaction forces generated between lugs 5 and ground 9. As shown in FIG. 3, each point on the leading edge 11, with respect to rolling direction 8, of the section of each lug 5 in any plane 12 (FIG. 1) perpendicular to axis 4 of rotation generates, with respect to ground 9, an interaction force F directed perpendicularly to leading edge 11.

Leading edge 11 is in the form of an involute curve outward of base surface 3 (an involute curve is the locus of the points for which, at each point on the curve, the perpendicular to the curve is tangent to the base circle). Alternatively, only a portion of leading edge 11 may be in the form of an involute curve.

By shaping leading edge 11 in the form of an involute curve outward of base surface 3, all the interaction forces F generated between lug 5 and ground 9 are directed downwards or are horizontal (the horizontal condition only occurs at the point in which the profile encounters the rolling surface). In other words, all the interaction forces F generated between lug 5 and ground 9 have any components perpendicular to ground 9 directed downwards.

This provides for superior traction of tyre 1, by maximizing the total traction of tyre 1, while at the same time eliminating any interaction force F between lug 5 and ground 9 having an upward vertical component (i.e. perpendicular to ground 9). An interaction force F between lug 5 and ground 9 having an upward vertical component is particularly damaging, by in no way contributing to traction, and by lifting and subsequently detaching part of ground 9, thus reducing the contact area between lug 5 and ground 9. Conversely, though not contributing to traction, an interaction force F between bar 5 and ground 9 having a downward vertical component is not particularly damaging, by simply compressing and compacting ground 9.

In a preferred embodiment, the involute curve shape of leading edge 11 of the section of each lug 5 is formed outward of base surface 3, assuming base surface 3 is perfectly cylindrical. Alternatively, the involute curve shape of leading edge 11 of the section of each lug 5 is formed outward of base surface 3, assuming base surface 3 is flattened at a contact area with ground 9.

More generally speaking, leading edge 11 is convex in shape, so that the perpendicular to leading edge 11 at each point of leading edge 11 located beneath rolling surface 9 has a direction in which any component perpendicular to the rolling surface is directed downwards.

To achieve this effect, the most advantageous shape of leading edge 11 of the section of each lug 5 along a plane 12 perpendicular to axis 4 of rotation is an involute curve outward of base surface 3, by eliminating interaction forces F having upward vertical components, while at the same time maximizing the overall traction of tyre 1.

An alternative embodiment, partly impairing leading edge 11 of the section of each lug 5, is a broken line inscribed in an involute curve outward of base surface 3, or a broken line comprising a number of segments, each substantially circumscribing a convex surface of an involute curve outward of base surface 3. In other words, leading edge 11 of the section of each lug 5 is a broken line comprising a number of segments, each substantially inscribed in or circumscribing a convex surface of an involute curve outward of base surface 3.

The broken-line embodiment is less satisfactory, by the interaction force F between lug 5 and ground 9 at times having an upward vertical component.

The invention claimed is:

1. An agricultural tire (1) comprising:
   a tread, which has a toroidal base surface extending about a central axis of rotation and tangent, in use, to a rolling surface of the ground; and
   a plurality of lugs, each extending radially outwards from the base surface and having a front wall and a rear wall with respect to a given rolling direction wherein, when mounted on a farm vehicle, the lugs are configured to sink into the rolling surface of the ground and form by compression holes negatively reproducing the shape of the lugs;
   wherein a leading edge, with respect to the rolling direction, of the section of each lug along any plane perpendicular to the axis of rotation is completely convex in shape and is in the shape of an involute curve outward of the base surface, so that the perpendicular to the leading edge at each point of the leading edge located below the rolling surface has a direction in which any component perpendicular to the rolling surface is directed downwards.

2. The agricultural tire of claim 1, wherein the involute curve is formed outward of the base surface when the base surface is not deformed.

3. The agricultural tire of claim 1, wherein the involute curve is formed outward of the base surface when the base surface (3) is deformed by being flattened at a contact area with the rolling surface under normal operating conditions of the tyre.

4. An agricultural tire comprising:
   a tread, which has a toroidal base surface extending about a central axis of rotation and tangent, in use, to a rolling surface of the ground; and
   a number of lugs, each extending radially outwards from the base surface and having a front wall and a rear wall with respect to a given rolling direction wherein, when mounted on a farm vehicle, the lugs are configured to sink into the rolling surface of the ground and form by compression holes negatively reproducing the shape of the lugs;
   a leading edge, wherein the entire leading edge, with respect to the rolling direction; of the section of each lug along any plane perpendicular to the axis of rotation, is in the form of a broken line comprising a number of segments that collectively, approximate a completely convex surface of an involute curve outward of the base surface.

* * * * *